United States Patent
Costabeber

(10) Patent No.: US 9,545,753 B2
(45) Date of Patent: Jan. 17, 2017

(54) METHOD FOR PRODUCING A THREE-DIMENSIONAL OBJECT AND STEREOLITHOGRAPHY MACHINE EMPLOYING SAID METHOD

(75) Inventor: Ettore Maurizio Costabeber, Zane' (IT)

(73) Assignee: DWS S.R.L., Zane' (Vi) (IT)

(*) Notice: Subject to any disclaimer, the term of this patent is extended or adjusted under 35 U.S.C. 154(b) by 0 days.

(21) Appl. No.: 14/009,780

(22) PCT Filed: Apr. 19, 2012

(86) PCT No.: PCT/IB2012/000776
§ 371 (c)(1),
(2), (4) Date: Oct. 3, 2013

(87) PCT Pub. No.: WO2012/143786
PCT Pub. Date: Oct. 26, 2012

(65) Prior Publication Data
US 2014/0027953 A1    Jan. 30, 2014

(30) Foreign Application Priority Data
Apr. 20, 2011 (IT) .............................. VI2011A0099

(51) Int. Cl.
B29C 67/00    (2006.01)

(52) U.S. Cl.
CPC ....... *B29C 67/0055* (2013.01); *B29C 67/0062* (2013.01); *B29C 67/0066* (2013.01); *B29C 67/0085* (2013.01)

(58) Field of Classification Search
CPC ............. B29C 67/0055; B29C 67/0066; B29C 67/0085; B29C 67/0062
(Continued)

(56) References Cited

U.S. PATENT DOCUMENTS 5,059,359 A * 10/1991 Hull et al. .................... 264/401
5,143,663 A *  9/1992 Leyden et al. ............... 264/401
(Continued)

FOREIGN PATENT DOCUMENTS

EP        0597114 A1   5/1994
WO    2010045950 A1   4/2010

OTHER PUBLICATIONS

International Search Report & Written Opinion dated Aug. 1, 2012—issued in PCT/IB2012/000776, filed on Apr. 19, 2012.

*Primary Examiner* — Nahida Sultana
(74) *Attorney, Agent, or Firm* — Husch Blackwell LLP

(57) ABSTRACT

A method for producing a three-dimensional object (11) in layers by using a stereolithography machine (1) that includes: a container (2) containing a fluid substance (3) suited to solidify through exposure to predefined radiation (4a); an emitter (4) suited to emit the predefined radiation (4a) and to solidify a layer of the fluid substance (3) adjacent to the bottom (2a) of the container (2); a modelling plate (5) suited to support the solidified layer (6) and associated with an actuator (7) suited to move it perpendicular to the bottom (2a) of the container; a leveler (8) arranged in contact with the fluid substance (3). The method includes: selectively irradiating the layer of fluid substance to obtain the solidified layer; extracting the solidified layer from the fluid substance; redistributing the fluid substance in the container by moving the leveler so that they are passed between the modelling plate and the container.

14 Claims, 3 Drawing Sheets

(58) Field of Classification Search
USPC ..... 264/401, 308, 497, 492; 425/174.4, 375; 118/110, 120
See application file for complete search history.

(56) References Cited

U.S. PATENT DOCUMENTS

| | | | |
|---|---|---|---|
| 5,238,614 A * | 8/1993 | Uchinono et al. ............ | 264/401 |
| 5,730,925 A * | 3/1998 | Mattes et al. ................. | 264/497 |
| 5,902,537 A * | 5/1999 | Almquist et al. ............. | 264/401 |
| 7,931,462 B2 * | 4/2011 | Mattes .......................... | 425/375 |
| 8,167,999 B2 * | 5/2012 | Alam et al. ................... | 106/772 |
| 2008/0112393 A1 * | 5/2008 | Ho et al. ....................... | 370/352 |
| 2008/0113293 A1 * | 5/2008 | Shkolnik ............. | B29C 67/0066 430/270.1 |
| 2009/0068376 A1 * | 3/2009 | Philippi et al. ............... | 427/532 |
| 2011/0089610 A1 * | 4/2011 | El-Siblani et al. ........... | 264/401 |
| 2011/0293771 A1 * | 12/2011 | Oberhofer et al. ........... | 425/182 |
| 2011/0297081 A1 * | 12/2011 | Green ................... | B22F 3/1055 118/641 |
| 2011/0310370 A1 | 12/2011 | Rohner | |
| 2016/0031105 A1 * | 2/2016 | Koebke ................. | B26D 1/015 83/36 |

* cited by examiner

METHOD FOR PRODUCING A THREE-DIMENSIONAL OBJECT AND STEREOLITHOGRAPHY MACHINE EMPLOYING SAID METHOD

BACKGROUND OF THE INVENTION

1. Field of the Invention

The present invention concerns a stereolithography method and a stereolithography machine employing said method.

2. Present State of the Art

As is known, the stereolithography technique is used to produce three-dimensional objects through the successive deposition of several layers of a light-sensitive liquid resin capable of polymerizing through exposure to a light source.

In particular, each resin layer is superimposed to the preceding layer of the three-dimensional object to be produced and is allowed to selectively solidify in the points corresponding to the volume of the object itself.

A stereolithography machine according to a known embodiment comprises a container suited to contain said liquid resin and provided with a transparent bottom.

There is also a light source, generally a laser emitter or a projector, capable of selectively irradiating the layer of liquid resin arranged adjacent to the bottom of the container so that it solidifies.

The machine comprises also a modelling plate suited to support the solidified layers of the three-dimensional object, associated with actuator means suited to provide for moving the plate in a direction perpendicular to the bottom of the container.

According to a stereolithography method of the known type using the above mentioned machine, first of all the modelling plate is arranged at a distance from the bottom of the container that is equal to the thickness of the layer to be solidified.

Successively, the liquid resin layer adjacent to the bottom of the container is selectively irradiated by means of the light source in order to solidify it.

The modelling plate is configured so that the solidified layer adheres to it while, in the contrary, the bottom of the container is provided with a covering that reduces such adhesion.

The modelling plate is successively moved away from the bottom of the container, so as to make the solidified layer emerge from the liquid resin and thus make it possible to restore the thickness of the liquid resin that is necessary for processing a successive layer of the object.

In fact, lifting the modelling plate and the solidified layer means leaving a depression in the liquid resin, which is filled by the spontaneous flow of the resin itself.

Said levelling action restores the thickness of the liquid resin that is necessary to solidify a new layer of the object and furthermore prevents air bubbles from remaining trapped into the liquid resin during the successive lowering of the modelling plate, which may affect the integrity of the successive layer of the three-dimensional object.

Once said spontaneous levelling is completed, the modelling plate is immersed to again in the liquid resin and a further layer of the object is solidified.

The method described above poses the drawback that the overall processing time of the three-dimensional object is considerably prolonged due to the waiting time needed after the solidification of each layer of the object for the liquid resin to level out.

Since the number of layers that form an object obtained through stereolithography can reach several hundreds, it can be understood that the waiting times mentioned above result in a considerable increase in the processing time.

Obviously, the waiting times are proportional to the viscosity of the liquid resin. Therefore, the drawback mentioned above is particularly important when resins of the so-called "hybrid" type are used, which comprise particles in ceramic or other materials mixed with the polymeric component.

Said hybrid resins are suitable for producing objects with high mechanical resistance but on the other hand their viscosity is much higher compared to the other resins commonly used in stereolithography.

A known embodiment, described in the Patent application WO 2010/045950, includes a movable tank and a fixed levelling paddle arranged in contact with the resin.

Before the solidification of each layer, the tank is moved so that the levelling paddle fills the depression left by the modelling plate when it is lifted.

This embodiment poses the drawback that it requires a certain amount of space for the movement of the tank that, consequently, involves an increase in the overall dimensions of the machine.

SUMMARY OF THE INVENTION

The present invention intends to overcome all the drawbacks of the known art as outlined above.

In particular, it is the object of the present invention to provide a stereolithography method and a stereolithography machine that make it possible to produce a three-dimensional object through the solidification of a fluid substance in layers, more rapidly than when employing the method of the known type described above.

It is a further object of the invention to limit the overall dimensions of the machine compared to the machines of the known type.

The above mentioned objects are achieved by a method for producing a three-dimensional object in layers according to claim 1.

The objects described above are also achieved by a stereolithography machine according to claim 6.

Further characteristics and details of the invention are described in the corresponding dependent claims.

Advantageously, the method and the machine that are the subjects of the is invention make it possible to produce a three-dimensional object in an overall time that is substantially independent of the viscosity of the fluid substance used.

Therefore, to advantage, the invention is particularly suited to be used with highly viscous liquid substances like, for example, the hybrid resins mentioned above, or with fluid pasty substances whose viscosity is even higher.

Still advantageously, the reduced overall dimensions make it easier to use the machine.

BRIEF DESCRIPTION OF THE DRAWINGS

The said objects and advantages, together with others which will be highlighted below, are illustrated in the description of some preferred embodiments of the invention which are provided by way of non-limiting examples with reference to the attached drawings, wherein:

FIGS. from 1 to 6 show schematic side views of the stereolithography machine of the invention, in different operating configurations.

DETAILED DESCRIPTION OF THE PREFERRED EMBODIMENTS

Figure 1:
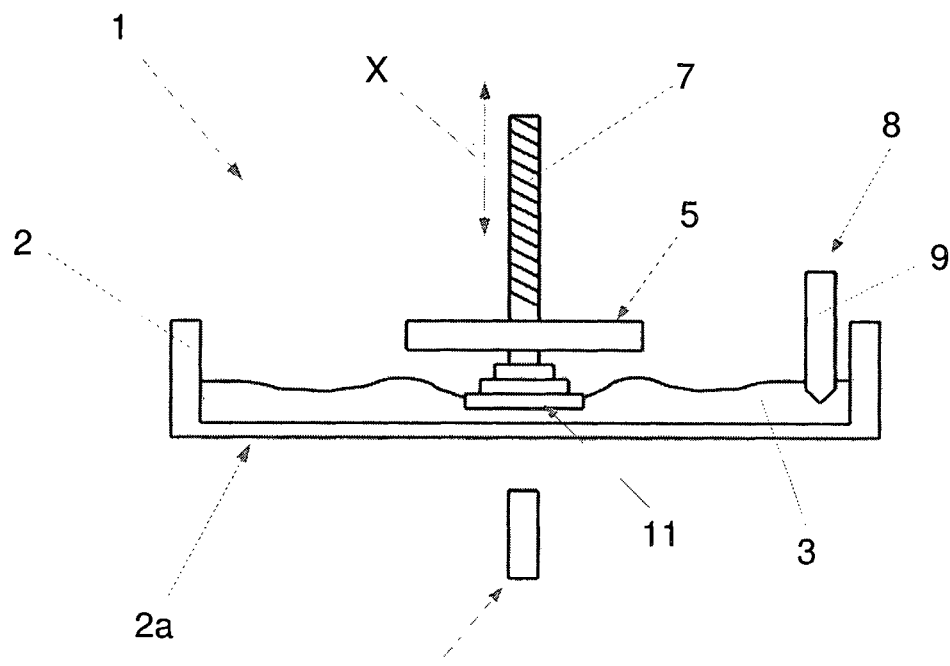

The method of the invention is described with reference to a stereolithography machine indicated as a whole by 1 in FIG. 1, which comprises a container 2 containing a fluid substance 3 suited to be solidified through exposure to predefined radiation 4a.

It is specified since now that the term "fluid substance" means a substance suited to be distributed in the container 2 so that its surfaces assumes a substantially flat shape, for example like that of a liquid or pasty substance.

The fluid substance 3 is preferably but not necessarily a light-sensitive polymeric liquid resin and the predefined radiation is light radiation.

In particular, said resin is of the so-called "hybrid" type, comprising particles in ceramic or other materials that are capable of increasing the mechanical resistance of the resin once it has solidified.

However, the method and the machine of the invention may be used with a fluid substance of any type, provided that it is able to solidify following exposure to predefined radiation.

The machine 1 also comprises means 4 suited to emit the predefined radiation 4a, capable of selectively irradiating a layer of the fluid substance 3 having a predefined thickness and arranged adjacent to the bottom 2a of the container 2 so as to solidify it.

Figure 2:
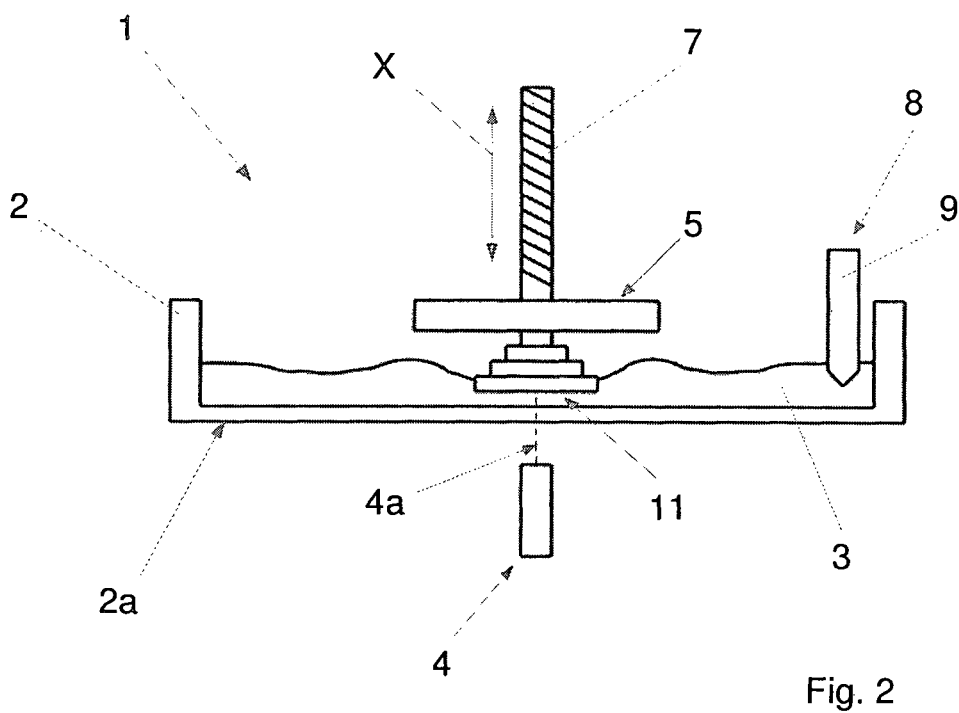

The emitter means 4 are preferably arranged under the container 2 and are configured so as to direct the predefined radiation 4a towards the bottom 2a of the container 2, which is transparent to radiation, as shown in FIG. 2.

Preferably, if the fluid substance 3 is a light-sensitive resin, the emitter means 4 comprise a laser light emitter associated with means suited to direct the light beam towards any point of the above mentioned layer of the fluid substance 3.

According to a variant embodiment of the invention, not illustrated herein, the emitter means 4 comprise a projector suited to generate a luminous image corresponding to the surface area of the layer of fluid substance 3 to be solidified.

The stereolithography machine 1 also comprises a modelling plate 5 facing the bottom 2a of the container 2 and suited to support the three-dimensional object 11 being formed.

The modelling plate 5 is associated with actuator means 7 suited to move it with respect to the bottom 2a according to a modelling direction X that is perpendicular to the same bottom 2a.

In particular, the modelling plate 5 is configured in such a way that the fluid substance 3 adheres to it once it has solidified.

On the contrary, the bottom 2a of the container 2 is preferably made of a material that prevents said adhesion.

According to the method of the invention, the modelling plate 5 is immersed in the fluid substance 3 until arranging it at a distance from the bottom 2a that is equal to the thickness of the solidified layer to be obtained.

Figure 3:
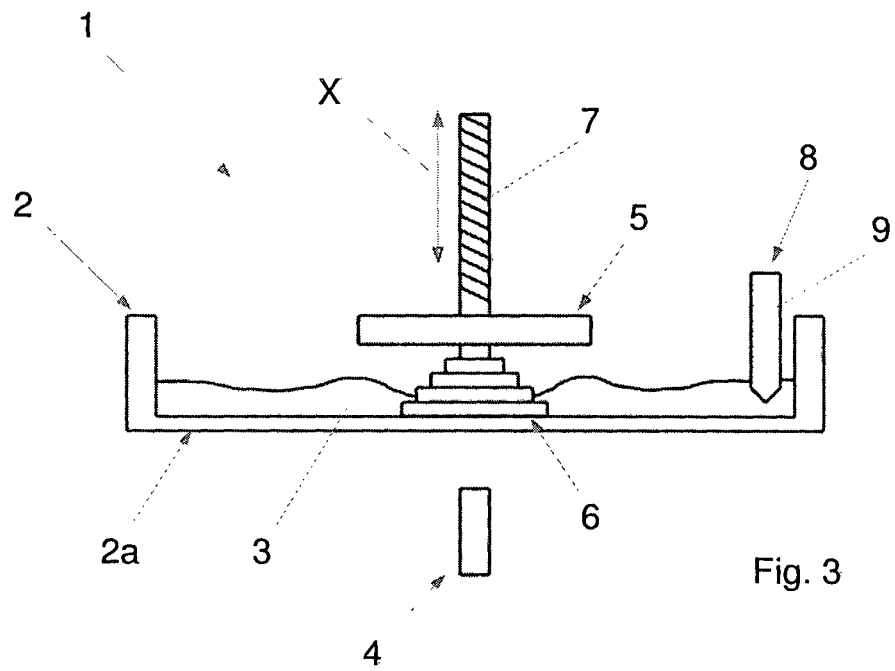

The layer of the fluid substance 3 is then selectively irradiated in order to obtain the solidified layer 6, which adheres to the modelling plate 5, as shown in FIGS. 2 and 3.

Figure 4:
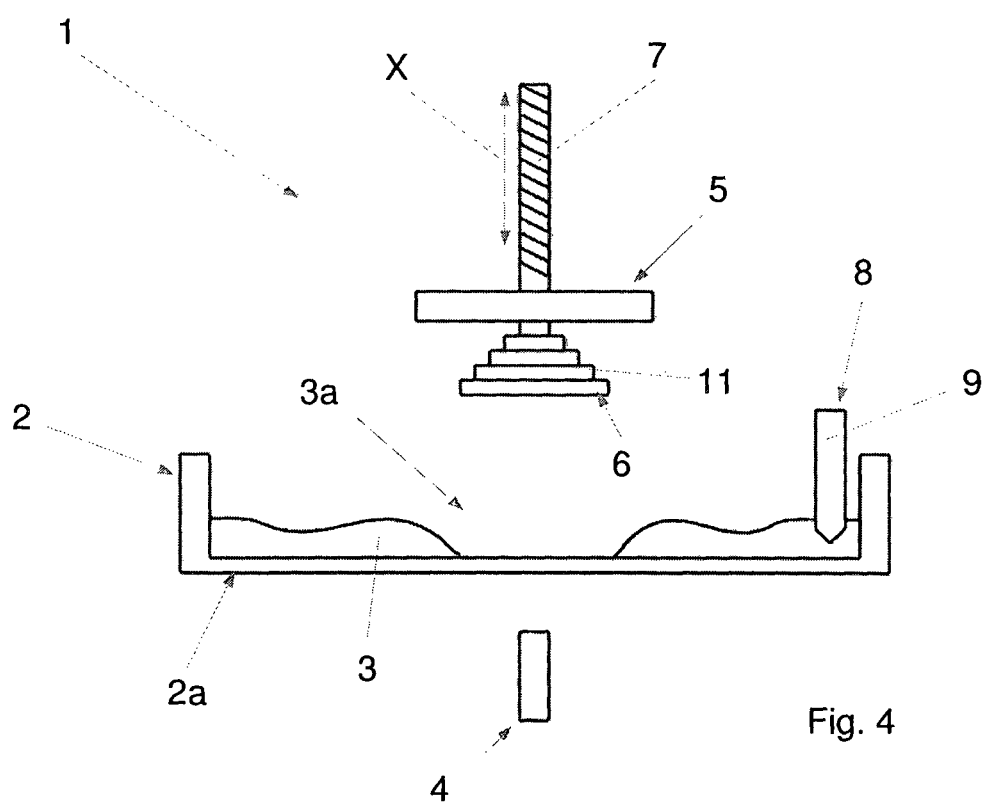

Successively, the modelling plate 5 is lifted in such a way as to move the solidified layer 6 away from the bottom 2a until it emerges from the fluid substance 3, as shown in FIG. 4.

Following the above mentioned movement of the solidified layer 6 away from the bottom 2a, in the fluid substance 3 contained in the container 2 there still is a depressed area 3a at the level of the position previously occupied by the modelling plate 5 and/or by the three-dimensional object 11 being formed.

According to the method of the invention, to fill the above mentioned depression 3a, the fluid substance 3 is redistributed in the container 2 by pushing the fluid substance 3 towards the depression 3a through levelling means 8 arranged in contact with the fluid substance 3.

In particular, said levelling means 8 are associated with power means, not shown herein but known per se, configured so as to move them with respect to the bottom 2a of the container 2 in contact with the fluid substance 3 according to a direction of movement Y, so as to redistribute the fluid substance 3 as described above.

During said movement, the levelling means 8 are passed between the modelling plate 5 and the container 2, that is, under the modelling plate 5.

In this way, there is no need to move the container 2 to carry out the levelling operation and therefore it is possible to limit the overall dimensions of the machine 1.

Successively, the modelling plate 5 is lowered again and the operations described above are repeated in order to obtain the solidification of a further layer of the object 11.

It can be understood that the above mentioned levelling means 8 make it possible to fill the depression 3a in a much quicker way compared to the known method previously described, in which the filling action is due to the spontaneous redistribution of the fluid substance.

Therefore, the waiting time for the levelling of the fluid substance 3 after the solidification of each layer of the object is considerably reduced, thus reaching the aim to reduce the overall processing time compared to the time required by the methods of the known type.

In particular, the higher the viscosity of the fluid substance 3 used, the shorter the overall processing time.

Therefore, the method of the invention is particularly suited to be used when the fluid substance 3 is a hybrid resin with high viscosity, as previously explained.

Preferably, furthermore, to redistribute the fluid substance 3 during the interval between the solidification of two successive layers, the levelling means 8 are moved in one direction only, opposite the direction corresponding to the previous redistribution process, as can be seen in the figures.

In particular, once each layer has solidified, the levelling means 8 pass beyond the modelling plate 5 and come to be positioned beside the latter, on the opposite side with respect to the side where they were positioned after the solidification of the previous layer.

In this way, to advantage, each operation for the redistribution of the fluid substance 3 does not require the return of the levelling means 8 to the initial position and is therefore particularly rapid.

The levelling means 8 are placed in contact with the surface of the fluid substance 3 in an area where the level is higher than the level of the fluid substance 3 at the height of the depression 3a, so as to be able to push the fluid substance 3 towards the depression 3a.

Preferably, the levelling means 8 comprise a paddle 9 mainly developed according to a longitudinal direction and whose length preferably corresponds to the width of the container 2.

In the figures, the paddle 9 is shown in a side view and therefore the just mentioned longitudinal direction is perpendicular to the plane of the figures themselves.

Figure 5:
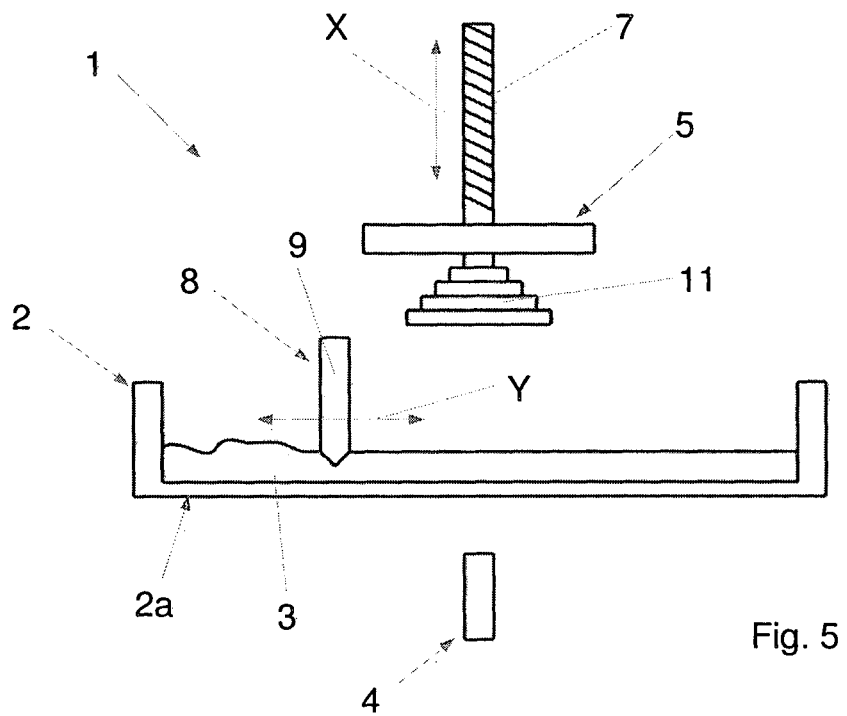

To push the fluid substance 3, the above mentioned paddle 9, arranged in contact with the fluid substance 3, is moved according to a direction of movement Y that is perpendicular to the above mentioned longitudinal direction, as shown in FIG. 5.

Figure 6:
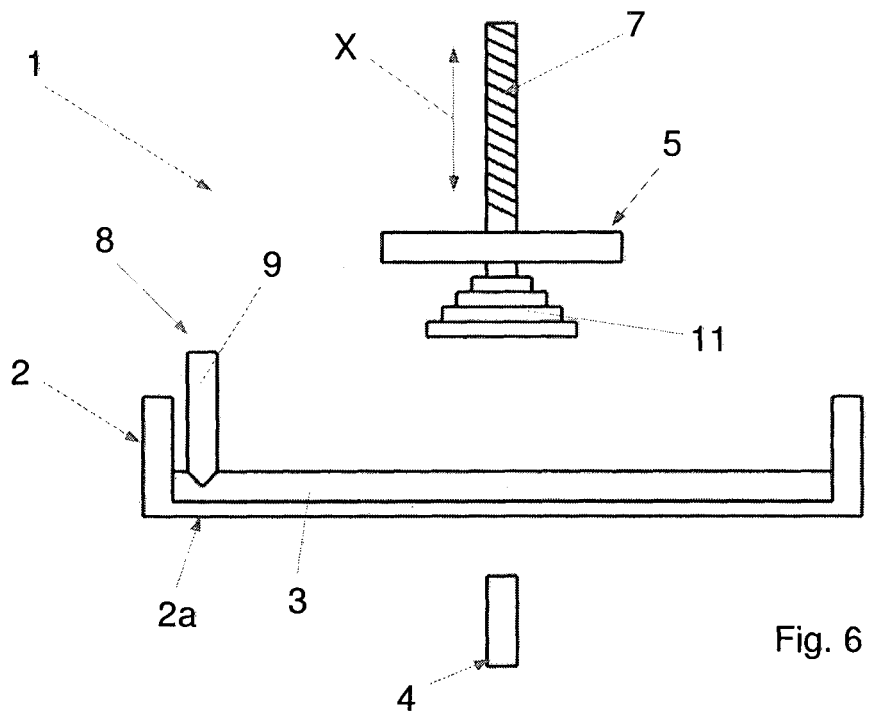

The movement of the paddle 9 makes it possible to level the fluid substance 3 in such a way as to obtain a substantially uniform thickness, as shown in FIG. 6.

Obviously, the paddle 9 can have any shape, even different from that shown in the figures, provided that it is suited to come into contact with the surface of the fluid substance 3 contained in the container 2 in order to level it.

According to a variant embodiment of the invention not illustrated herein, the container 2 is movable with respect to the modelling plate 5 in a direction Y that is perpendicular to the longitudinal direction of the paddle 9.

In this case, the redistribution of the fluid substance 3 takes place through a combination of the movements of the paddle 9 and of the container 2.

The above clearly shows that the invention achieves all the set objects.

In particular, the use of levelling means to fill the depression present in the fluid substance after the solidification of each layer of the object makes it possible to reduce the waiting time before the solidification of the successive layer.

Consequently, the overall time necessary to make the three-dimensional object is considerably reduced compared to the time needed when using the stereolithography methods of the known type, and said time reduction becomes larger as the viscosity of the fluid substance used increases.

Furthermore, the fact that the levelling means are moved so that they pass between the modelling plate and the container makes it possible to limit the overall dimensions of the machine.

The method and the machine that are the subjects of the invention may be subjected to further changes that, even though not described herein and not illustrated in the drawings, must all be considered protected by the present patent, provided that they fall within the scope of the following claims.

Where technical features mentioned in any claim are followed by reference signs, those reference signs have been included for the sole purpose of increasing the intelligibility of the claims and accordingly such reference signs do not have any limiting effect on the protection of each element identified by way of example by such reference signs.

The invention claimed is:

1. A method for producing a three-dimensional object in layers by a stereolithography machine, the method comprising:
   a container for a fluid substance in the liquid or paste state suited to be solidified through exposure to predefined radiation, the container having a bottom;
   means for emitting said predefined radiation, suited to selectively irradiate a layer of said fluid substance having a predefined thickness and arranged adjacent to said bottom in order to solidify it;
   a modelling plate suited to support said solidified layer;
   actuator means for moving said modelling plate with respect to said bottom at least according to a modelling direction (X) that is perpendicular to said bottom;
   levelling paddle developed mainly according to a longitudinal direction arranged in contact with said fluid substance;
   said method comprising the following operations:
   immersing said modeling plate in said fluid substance, said modeling plate being arranged at a distance from said bottom equal to said predefined thickness so as to define said layer of fluid substance;
   selectively irradiating said layer of fluid substance in such a way as to obtain said solidified layer;
   moving said solidified layer away from said bottom so as to make it emerge from said fluid substance wherein said moving of said solidified layer leaves a depression in said fluid substance, said depression being adjacent to said bottom;
   filling said depression by moving said levelling paddle between said modelling plate and said container from a first area of said container, in which the level of said fluid substance is higher than the level of said depression, towards said depression, wherein said leveling paddle is immersed in and extracted from said fluid substance, and wherein the levelling paddle is kept in contact with said fluid substance in said container during the movement.

2. The method according to claim 1, wherein said movement is performed through the displacement of said paddle in a direction of movement (Y) perpendicular to said longitudinal direction.

3. The method according to claim 1, wherein during each redistribution process of said fluid substance that takes place during the interval between the solidification of two successive layers said movement takes place in a single direction of movement (Y) so that said levelling paddle passes from one side of said modelling plate to the other side.

4. The method according to claim 3, wherein said movement of said levelling paddle during each of said distribution operations take place in the opposite direction with respect to the previous distribution operation.

5. The method according to claim 1, wherein said fluid substance is a mixture comprising a polymeric component and a particulate material, or is a pasty substance.

6. A stereolithography machine comprising:
   a container for a fluid substance in the liquid or paste state suited to be solidified through exposure to predefined radiation;
   means for emitting said predefined radiation, suited to selectively irradiate a layer of said fluid substance having a predefined thickness and arranged adjacent to the bottom of said container in order to solidify it;
   a modelling plate suited to support said solidified layer;
   actuator means for moving said modelling plate with respect to said bottom at least according to a modelling direction (X) that is perpendicular to said bottom;
   levelling paddle developed mainly according to a longitudinal direction wherein the paddle is immersed in and extracted from said fluid substances and is adapted for pushing said fluid substance when moved in contact with said fluid substance so as to cause said fluid substance to be redistributed in said container;
   power means for moving said levelling paddle in contact with said fluid substance between said modelling plate and said container in such a way that said levelling paddle pushes said fluid substance towards a depression in said fluid substance in order to fill said depression.

7. The stereolithography machine according to claim 6, wherein said power means are configured so as to move said paddle in a direction (Y) perpendicular to said longitudinal direction.

8. The stereolithography machine according to claim 6, wherein said power means are configured so as to move said paddle perpendicular to said bottom and to immerse it in and extract it from said fluid substance.

9. The stereolithography machine according to claim 6, wherein said paddle is configured such that said movement of said paddle is capable of conferring a uniform thickness to said fluid substance.

10. The stereolithography machine according to claim 9, wherein said paddle is arranged at a distance from said bottom.

11. The stereolithography machine according to claim 6, wherein said fluid substance is a mixture comprising a polymeric component and a particulate material, or is a pasty substance.

12. The method according to claim 1, wherein it comprises moving said paddle so as to confer uniform thickness to said fluid substance.

13. The method according to claim 1, wherein said paddle is arranged at a distance from said bottom.

14. The method according to claim 1, wherein said depression has a depth bigger than said predefined thickness.

* * * * *